US012683645B2

(12) United States Patent
Kankipati et al.

(10) Patent No.: US 12,683,645 B2
(45) Date of Patent: Jul. 14, 2026

(54) ARBITRATION CIRCUIT PORTIONS

(71) Applicant: Nordic Semiconductor ASA, Trondheim (NO)

(72) Inventors: Sriram Kankipati, Hyderabad (IN); Murali Mohan Thokala, Hyderabad (IN)

(73) Assignee: Nordic Semiconductor ASA, Trondheim (NO)

( * ) Notice: Subject to any disclaimer, the term of this patent is extended or adjusted under 35 U.S.C. 154(b) by 326 days.

(21) Appl. No.: 18/379,538

(22) Filed: Oct. 12, 2023

(65) Prior Publication Data

US 2024/0137064 A1 Apr. 25, 2024
US 2024/0235601 A9 Jul. 11, 2024

(30) Foreign Application Priority Data

Oct. 20, 2022 (IN) .............................. 202211060078
Dec. 14, 2022 (GB) .................................... 2218865

(51) Int. Cl.
H04B 1/40 (2015.01)

(52) U.S. Cl.
CPC ...................................... H04B 1/40 (2013.01)

(58) Field of Classification Search
CPC ...... H04B 17/318; H04B 1/40; H04B 7/0608; H04B 1/005; H04B 1/0057; H04B 1/3838; H04B 1/401; H04B 17/327; H04B 7/0626; H04B 7/063; H04B 7/0691; H04B 7/0822; H04B 7/0834
USPC .......................................................... 455/73
See application file for complete search history.

(56) References Cited

U.S. PATENT DOCUMENTS

2009/0137206 A1 5/2009 Sherman et al.
2022/0030614 A1* 1/2022 Chen ................... H04W 72/542
2025/0039864 A1* 1/2025 Ren ................... H04W 72/1215

FOREIGN PATENT DOCUMENTS

EP       1 890 431 A2   2/2008
WO   WO 2009/086851 A1   7/2009

OTHER PUBLICATIONS

IPO Combined Search and Examination Report under Sections 17 and 18(3) for GB2218865.0, mailed Jun. 15, 2023, 6 pages.

* cited by examiner

*Primary Examiner* — Ajibola A Akinyemi
(74) *Attorney, Agent, or Firm* — Klarquist Sparkman, LLP

(57) ABSTRACT

An arbitration circuit portion is provided for coordinating first and second radio circuit portions arranged to transmit and/or receive radio signals. The arbitration circuit is arranged to receive a communication request signal from the first radio circuit portion and/or the second radio circuit portion; determine an arbitration outcome based at least partially on said communication request signal; and apply said arbitration outcome to the first and/or second radio circuit portions. The arbitration circuit portion is operable in a normal arbitration mode, in which determining the arbitration outcome comprises determining an input state based at least partially on said communication request signal and determining an arbitration outcome that corresponds to said input state according to a set of arbitration rules; and a first radio priority mode in which the arbitration outcome prioritizes all requests from the first radio circuit portion over requests from the second radio circuit portion.

20 Claims, 3 Drawing Sheets

ARBITRATION CIRCUIT PORTIONS

CROSS REFERENCE TO RELATED APPLICATIONS

This application claims priority from Great Britain Application No. 2218865.0, filed Dec. 14, 2022, and claims priority to Indian Application No. 202211060078, filed Oct. 20, 2022, which applications are incorporated herein by reference in their entirety.

BACKGROUND OF THE INVENTION

The present invention relates to arbitration circuit portions for coordinating coexisting radio circuit portions.

Many different wireless radio communication protocols share the same or overlapping frequency bands. For instance, Bluetooth, Zigbee, Thread and some WLAN protocols use the 2.4 GHz ISM band, because in many countries it can be used at low powers without a specific license. This can lead to communication issues when signals according to such protocols are transmitted simultaneously in close proximity (i.e. when multiple protocols coexist in the same area). When two or more radio communication protocols operate in close proximity and share the same frequency band, they are sometimes referred to as coexisting protocols.

Many modern devices can themselves support multiple wireless communication protocols that share the same frequency band—e.g. a modern mobile telephone may support a Bluetooth connection (e.g. with wireless headphones) at the same time as a wireless local area network (WLAN) connection (e.g. with a Wi-Fi router). Some devices are even arranged to use a common antenna for protocols sharing the same frequency band. To avoid interference issues, devices supporting multiple wireless communication protocols that share the same frequency band typically implement coexistence procedures. Conventional coexistence procedures include packet traffic arbitration (PTA), in which different radio modules send communication request signals (i.e. requests to send or receive a data packet in a particular time window) to an arbitration circuit, which issues a grant signal to only one radio module at a time.

Typically, a PTA circuit handles competing request signals using predetermined priority logic, e.g. always prioritising WLAN transmissions over Bluetooth transmissions. However, this approach may not be optimal for all conditions and may lead to situations in which one communication protocol dominates over the other. An improved approach may be desired.

SUMMARY OF THE INVENTION

According to a first aspect of the present invention there is provided an arbitration circuit portion for coordinating first and second radio circuit portions arranged to transmit and/or receive radio signals in a common frequency band, wherein said arbitration circuit portion is arranged to:

receive a communication request signal from the first radio circuit portion and/or the second radio circuit portion;

determine an arbitration outcome based at least partially on said communication request signal; and apply said arbitration outcome to the first and/or second radio circuit portions;

wherein the arbitration circuit portion is operable in:

a normal arbitration mode, in which determining the arbitration outcome comprises determining an input state based at least partially on said communication request signal and determining an arbitration outcome that corresponds to said input state according to a set of arbitration rules; and a first radio priority mode in which the arbitration outcome prioritises all communication requests from the first radio circuit portion over communication requests from the second radio circuit portion.

Thus, it will be appreciated by those skilled in the art that the arbitration circuit portion can provide effective and equitable arbitration between the coexisting first and second radio circuit portions. Because the arbitration circuit portion can operate in the first radio priority mode, it can provide prioritised access to the common frequency band to the first radio circuit portion when needed (e.g. in periods of high priority or high duty-cycle communication traffic by the first radio circuit portion) whilst still facilitating normal arbitration (e.g. when requests from either radio circuit portion may be granted) at other times using the normal arbitration mode.

The arbitration circuit portion may be configured to operate in the first radio priority mode according to a predetermined schedule, e.g. stored internally by the arbitration circuit portion. Using a predetermined schedule may enable, for instance, the first radio circuit portion to schedule its high priority communications for a preset time window in which it knows it will always have priority access to the common frequency band. However, a static approach may not be particularly useful in many implementations where the activity of the first and/or second radio circuit portions is variable or unpredictable, e.g. because a pre-allocated period of first radio priority mode operation may not coincide with the first radio circuit portion needing prioritised communications.

Therefore, in a set of embodiments, the arbitration circuit portion is configured to operate in the first radio priority mode based at least partially on one or more external stimuli, e.g. from the first or second radio circuit portion, or from a host device (e.g. a device arranged to control the first and/or second radio circuit portions to transmit and/or receive radio signals).

In a set of embodiments, the arbitration circuit portion may be arranged to operate in the first radio priority mode in response to a priority window request from the first radio circuit portion. The priority window request specifies a time window for which first radio priority mode operation is requested. The priority window request may specify a desired start time for the window, although in some embodiments the requested window may simply start immediately with the request, or with a fixed delay after the request. The priority window request may specify a duration of the window, although alternatively all priority windows (or all windows of a particular type) may just have a standard duration, or the duration of the requested priority window may be undefined by the priority window request, with an end to the priority window indicated with a subsequent signal. The priority window request may include additional information relating to the request, such an indication of an importance of the request (e.g. a numeric importance level) and/or an indication of whether the requested first priority mode operation could be deferred (e.g. if the actions for which the first radio priority mode is needed could be postponed if needed).

In some scenarios it may be acceptable to provide only the first radio circuit portion with the possibility for priority operation (e.g. if second radio circuit portion communications are generally less important than first radio circuit portion communications). However, in many implementations it may be advantageous to allow priority operation for both the first and second radio circuit portions. In a set of embodiments, the arbitration circuit portion is operable in a second radio priority mode in which all communication requests from the second radio circuit portion are prioritised over communication requests from the first radio circuit portion.

In a corresponding manner to that described above, the arbitration circuit portion may be arranged to operate in the second radio priority mode in response to a priority window request from the second radio circuit portion. Features of the priority window request explained above with respect to the first radio circuit portion may also, additionally or alternatively, apply to the priority window requests from the second radio circuit portion.

The arbitration circuit portion may be arranged to grant (e.g. immediately) all priority window requests from the first radio circuit portion (i.e. to operate in the first radio priority mode whenever it is requested by the first radio circuit portion). Additionally or alternatively, in relevant embodiments, the arbitration circuit portion may be arranged to grant (e.g. immediately) all priority window requests from the second radio circuit portion. Simply granting priority window requests may ensure that the first and/or second radio circuit portion is always able to obtain prioritised use of the common frequency band when it needs it. However, in a set of embodiments the arbitration circuit portion is arranged to determine whether to grant or refuse a priority window request (i.e. to operate in the first or second radio priority mode in the desired time window) based on one or more factors such as a current state of the arbitration circuit portion and/or a current state of one or both of the first and second radio circuit portions and/or further information relating to the priority window request. For instance, the arbitration circuit portion may consider whether the requested priority window would interfere with an ongoing communication by the other of the first and second radio circuit portions or an ongoing priority window of the other of the first and second radio circuit portions, and/or a relative importance of the first and second radio circuit portions, communications or priority windows thereof.

In a set of embodiments, the arbitration circuit portion is arranged, on receipt of a priority window request from the first radio circuit portion, to determine if there exists a conflicting priority window request from the second radio circuit portion (i.e. a priority window request that relates to a planned or already-ongoing priority window which coincides with the newly requested priority window) and, if there is no conflicting priority window request, to operate in the first radio priority mode according to the priority window request from the first radio circuit portion (i.e. in a time window corresponding to the priority window request). Conversely, additionally or alternatively, the arbitration circuit portion may be arranged, on receipt of a priority window request from the second radio circuit portion, to determine if there exists a conflicting priority window request from the first radio circuit portion and, if there is no conflicting priority window request, to operate in the second radio priority mode according to the priority window request from the second radio circuit portion (i.e. in a time window corresponding to the priority window request).

Put generally, in a set of embodiments, the arbitration circuit portion is arranged, on receipt of a new priority window request, to determine if there exists a conflicting priority window request and, if there is no conflicting priority window request, to grant the received priority window request.

In a set of embodiments the arbitration circuit portion is arranged, on receipt of a priority window request from the first radio circuit portion:

to determine if there exists a conflicting priority window request from the second radio circuit portion and, if there is a conflicting priority window request:

to determine which of the priority window request from the first radio circuit portion and the conflicting priority window request from the second radio circuit portion has a higher importance; and to operate in the first or second radio priority mode according to the priority window request with the higher importance.

Conversely, additionally or alternatively, the arbitration circuit portion may be arranged, on receipt of a priority window request from the second radio circuit portion:

to determine if there exists a conflicting priority window request from the first radio circuit portion and, if there is a conflicting priority window request:

to determine which of the priority window request from the second radio circuit portion and the conflicting priority window request from the first radio circuit portion has a higher importance; and to operate in the first or second radio priority mode according to the priority window request with the higher importance.

Put generally, in a set of embodiments, the arbitration circuit portion is arranged, on receipt of a new priority window request, to determine if there exists a conflicting priority window request and, if there is a conflicting priority window request:

to determine which of the new priority window request and the conflicting priority window request has a higher importance; and to grant the priority window request with the higher importance.

Determining which of the priority window requests has a higher importance may comprise determining if either of the first and second radio circuit portions has a higher precedence. For instance, the arbitration circuit portion may be configured such that all priority window requests from the first radio circuit portion (e.g. a WLAN radio circuit portion) are more important than priority window requests from the second radio circuit portion (e.g. BLE radio circuit portion) or vice-versa.

Additionally or alternatively, determining which of the priority window requests has a higher importance may comprise assessing indications of importance included with the priority window requests themselves. For instance, the arbitration circuit portion may be configured to determine which priority window request indicates a higher importance. An indication of importance may include an indication of whether the requested priority window can be deferred and/or a quantitative importance metric (e.g. numeric score). A priority window request which indicates that it can be deferred may be of lower importance than a priority window request which indicates that it cannot be deferred.

The arbitration circuit portion may be arranged, on receipt of a priority window request which conflicts with an ongoing priority window and has a higher importance than the ongoing priority window, to cut short the ongoing priority window and operate in the radio priority mode (i.e. the first or second radio priority mode) according to the newly received priority window request. This may comprise instructing the radio circuit portion corresponding to the ongoing priority request to abort any ongoing communications. However, interrupting ongoing communications may lead to errors so in a set of embodiments, determining which of the priority window requests has a higher importance may comprise determining if the conflicting priority window request corresponds to a priority window that has already started. A priority window which has already started may be considered to be more important than an otherwise-equivalent priority window which has not yet started (e.g. because interrupting an ongoing priority window is more likely to cause errors). In other words, the arbitration circuit portion may be reluctant to interrupt an ongoing priority window, even if it would otherwise be considered less important than a new priority window request.

In a set of embodiments, the arbitration circuit portion may be arranged to consider a combination of factors when determining which of the priority window requests has a higher importance. The arbitration circuit portion may be arranged to combine an indication of importance included in a priority window request with a relative precedence of the radio circuit portion from which the request was received, when determining which of the priority window requests has a higher importance. For instance, if both of the priority window requests have the same indication(s) of importance (e.g. the same numerical importance metric), the arbitration circuit portion may decide which request to grant based on the relative precedence of the first and second radio circuit portions.

The first and/or second radio circuit portions being able to request priority windows may improve communication reliability, e.g. when a radio circuit portion needs to guarantee uninterrupted communication. However it may not be optimal for all implementations, as it could lead to situations in which one radio circuit portion entirely dominates over another radio circuit portion with less important requests, even if it would be acceptable to allow the less important radio circuit portion to communicate from time to time.

In a set of embodiments, the arbitration circuit portion is arranged to operate in the first radio priority mode in periodic priority windows occurring at regular intervals. This may allow the first radio circuit portion to make any high priority communications in the periodic priority windows whilst still providing regular periods in which the first radio circuit portion is not prioritised (e.g. in which the arbitration circuit portion operates in the normal mode). Similarly, in embodiments where the arbitration circuit portion is operable in a second radio priority mode, the arbitration circuit portion may be arranged to operate in the second radio priority mode in periodic priority windows occurring at regular intervals.

The duration and/or period of periodic priority windows (i.e. periodic windows of first or second radio priority mode operation) may be fixed, e.g. determined by an initial configuration of the arbitration circuit portion. However, in a set of embodiments, the duration and/or period of a periodic priority window may be determined based on activity of the first and/or second radio circuit portion, e.g. based on measured and/or expected communication activity. For instance, a host device (e.g. a device also arranged to control the first and/or second radio circuit portions to transmit and/or receive radio signals) may recognise an upcoming period of high activity for one or both radio circuit portions (e.g. a period of high duty-cycle traffic or continuous asynchronous reception such as a scan mode) and, instruct the arbitration circuit portion to enter into periodic priority window operation with a duration and period suitable for facilitating said activity. In some embodiments, the arbitration circuit portion itself is configured to monitor activity of the first and/or second radio circuit portions and determine a suitable duration and/or period for periodic priority windows.

The arbitration circuit portion may comprise a periodic priority window generator, which is arranged to control the arbitration circuit portion to operate in the first (or second) radio priority mode in periodic priority windows. For instance, the periodic priority window generator may be arranged to output a periodic signal instructing the arbitration circuit portion to operate in the first (or second) radio priority mode. The periodic priority window generator may be configurable by an external device such as a host device.

In some embodiments, the arbitration circuit portion is arranged to operate in alternating first and second periodic priority windows, i.e. alternating between operating in the first radio priority mode in a first periodic priority window and the second radio priority mode in the second periodic priority window. Alternately prioritising the first radio circuit portion and the second radio circuit portion may ensure that both radio circuit portions are able to communicate regularly and at predictable times. The first and second periodic priority windows may be of equal duration, but in some embodiments they may have different durations, e.g. selected based on measured and/or expected communication activity of the first and second radio circuit portions, as explained above. The first and second periodic priority windows may have equal periods (i.e. the may occur with the same frequency). However, in some embodiments, one of the first and second periodic priority windows may have a period that is an integer multiple of the other periodic priority window (i.e. so that one periodic priority window occurs for every n other periodic priority windows). The first and second periodic priority windows may be adjacent in time (i.e. there may be no gap between the periods of first and second radio priority mode operation).

The use of periodic priority windows may facilitate equitable sharing of the common frequency resource between the two radio circuit portions. However, in some situations it may not be possible to predict reliably optimal periodic priority window parameters (e.g. duration, period) for a given communication situation. For instance, during BLE audio streaming, a BLE radio may transmit in short periodic bursts of semi-unpredictable length. In such situations a periodic priority window for the BLE radio or another coexistent radio must be sized to accommodate the longest possible BLE packet that may occur, resulting in sub-optimal resource use.

In a set of embodiments, the arbitration circuit portion is arranged to operate in the first radio priority mode based on a communication request signal from the second radio circuit portion. The arbitration circuit portion may be arranged to operate in the first radio priority mode in response to a lowering of a communication request signal from the second radio circuit portion (i.e. indicating that a period of second radio circuit portion communication has just ended). Entering the first radio priority mode in response to the lowering of the communication request signal from the second radio circuit portion may ensure that the first radio priority mode does not interfere with communication by the second radio circuit portion whilst maximising the time for which the first radio priority mode can be used. Conversely, in relevant embodiments, the arbitration circuit portion may be arranged to operate in the second radio priority mode based on a communication request signal from the first radio circuit portion (e.g. the lowering thereof).

The arbitration circuit portion may be arranged, after entering the first radio priority mode in response to the lowering of the communication request signal from the second radio circuit portion, to operate in the first radio priority mode for a duration based on an expected time of a next communication request signal from the second radio circuit portion (e.g. with a duration such that the first priority mode operation does not coincide with an expected next communication request signal from the second radio circuit portion). In other words, the arbitration circuit portion may be arranged to enter a priority window for the first radio circuit portion in an interval between the lowering of the communication request signal from the second radio circuit portion and a subsequent assertion of a communication request signal from the second radio circuit portion. This period of first radio priority mode operation may be referred to as a virtual priority window.

The duration of said period of first priority mode operation may be calculated based on expected timing of communication request signals from the second radio circuit portion. For instance the duration of the virtual priority window may be selected to fill as much of the time between the lowering of a communication request signal and its reassertion (i.e. to optimise resource use). The duration of said period of first priority mode operation may be determined based on a duration and period of preceding communication request signals from the second radio circuit portion. Measuring a previous pattern of communication request signals may allow for optimal selection of the duration of the virtual priority window.

In a set of embodiments, the arbitration circuit portion is arranged to measure a duration and/or frequency of a series of communication requests from the second radio circuit portion and use said measurement to determine a duration of the period of first priority mode operation entered in response to the lowering of a communication request from the second radio circuit portion. Alternatively, this measurement may be performed by another device (e.g. a host device) and the results and/or a determined duration provided to the arbitration circuit portion. The duration of the period of first priority mode operation may be selected to be less than a minimum interval between past communication request lowerings and subsequent assertions from the second radio circuit portion, to reduce the likelihood of the first priority mode operation colliding with the next communication request (i.e. so that the first priority mode operation happens in the interval between radio circuit portion communication requests).

Alternatively (or additionally) to operating in the first radio priority mode in response to the lowering of the communication request signal from the second radio circuit portion, the arbitration circuit portion may be arranged to operate in first radio priority mode in response to another signal related to the communication request signal, such as the lowering of a grant signal sent to the second radio circuit portion. The functionality described above in the context of responding to the lowering of the communication request signal may be applied equally to an arbitration circuit portion acting in response to the lowering of a grant signal.

In relevant embodiments, additionally or alternatively, the arbitration circuit portion may be arranged to operate in the second radio priority mode based on a communication request signal from the first radio circuit portion in a corresponding manner to that described above.

The arbitration circuit portion may comprise an activity measurement circuit portion arranged to detect communication requests from the first and/or second radio circuit portion. The activity measurement circuit portion may be arranged to measure a period and/or duration of said requests. Such measurements may be used to determine periodic priority window timings and/or virtual priority window timings as explained above.

In a set of embodiments, the first radio circuit portion is arranged to transmit and/or receive radio signals according to a first wireless communication protocol. The first wireless communication protocol may be a wireless local area network (WLAN) protocol, e.g. according to one of the IEEE 802.11 standards, often referred to as Wi-Fi. In some embodiments, the second radio circuit portion is arranged to transmit and/or receive radio signals according to a second wireless communication protocol, different to said first wireless communication protocol. The second wireless communication protocol may be a wireless personal area network (WPAN) protocol, such as Bluetooth, Zigbee or Thread (e.g. Bluetooth Low Energy (BLE)). The first wireless communication protocol may support longer-range and/or higher data rate communications than the second wireless communication protocol.

Conversely, the second wireless communication protocol may be a wireless local area network (WLAN) protocol, and/or the first wireless communication protocol may be a wireless personal area network (WPAN) protocol.

The common frequency band may be an industrial, scientific and medical (ISM) radio band. For instance, the common frequency band may include frequencies between 2.4 GHz-2.5 GHz.

The first and/or second radio circuit portion may comprise a radio transceiver circuit portion, i.e. arranged to transmit and receive radio signals. In some embodiments one or both of the first and/or second radio circuit portions may be arranged to only to transmit or only to receive. The communication request signals the arbitration circuit portion is arranged to receive may be transmit request signals or receive request signals.

The arbitration outcome may comprise a decision to grant the communication request, i.e. to permit the first or second radio circuit portion to perform the requested communication. Conversely, the arbitration outcome may comprise a decision not to grant the communication request (i.e. to refuse the request). The arbitration circuit portion may be arranged to apply the arbitration outcome by outputting a grant signal to the radio circuit portion from which the communication request was received (if the outcome is a decision to grant the request), or refraining from outputting a grant signal to the radio circuit portion from which the communication request was received (if the outcome is a decision not to grant the request). Conversely, applying the arbitration outcome may comprise the arbitration circuit portion outputting a refusal signal to the radio circuit portion from which the communication request was received, or refraining from outputting a refusal signal.

The arbitration outcome and its application may not necessarily relate only to the radio circuit portion from which the communication request was received. For instance, in a set of embodiments, the arbitration outcome comprises a decision to interrupt or abort an activity of the first or second radio circuit portion to facilitate communication of the radio circuit portion from which the communication request was received. Applying this may comprise the arbitration circuit portion outputting an abort signal to the first or second radio circuit portion. In a set of embodiments, additionally or alternatively, the arbitration outcome comprises a decision to inform the first or second radio circuit portion that the other radio circuit portion is currently communicating (i.e. is busy). Accordingly, the arbitration circuit portion may be arranged to output a busy signal to the first or second radio circuit portion to indicate that the other radio circuit portion is currently communicating, e.g. because a request from the other radio circuit portion has been granted.

The arbitration outcome may comprise a plurality of decisions, e.g. relating to one or both radio circuit portions. The arbitration circuit portion may be arranged to apply the arbitration outcome by outputting signals to both of the first and second radio circuit portions as explained above (i.e. grant, refusal, abort and/or busy signals). The arbitration outcome may comprise a decision to grant requests from both radio circuit portions, e.g. to allow both radio circuit portions to attempt to receive a communication at the same time. In some circumstances, it may be permissible to allow one of the radio circuit portions to transmit whilst the other is attempting to receive (e.g. when a failed reception attempt is acceptable, even if not desirable).

The arbitration outcome may not only relate to the first and second radio circuit portions. For instance, the arbitration outcome may comprise a decision to connect a shared antenna to one of the first and second radio circuit portions (e.g. because its communication request has been granted). The arbitration circuit portion may be arranged to output an antenna switching signal to control the connection of a shared antenna to the first and/or second radio circuit portion.

In a set of embodiments, the arbitration circuit portion may comprise coexistence hardware arranged to determine and apply the arbitration outcome. The coexistence hardware may comprise a packet traffic arbiter (PTA) arranged to apply the set of arbitration rules. The coexistence hardware may be arranged to receive the communication request signal. The coexistence hardware may be arranged to generate one or more signals to apply the arbitration outcome (e.g. grant, refusal, busy signals). The coexistence hardware may comprise one or more interfaces for sending and/or receiving signals from the first and/or second radio circuit portions.

The arbitration circuit portion may comprise a controller arranged to manage operation of the coexistence hardware (i.e. to act as a coexistence manager). The controller may control which mode the arbitration circuit portion operates in, e.g. by sending appropriate control signals to the coexistence hardware. The controller may be arranged to carry out activity measurements and/or to determine suitable durations of priority windows. The controller may be arranged to receive priority window requests from the first and/or second radio circuit portions.

The arbitration circuit portion (e.g. the coexistence hardware, a PTA or an interface) may be arranged to be connected to the first radio circuit portion or the second radio circuit portion by a 1-wire connection (e.g. a single conductor). The 1-wire connection may provide a single communication channel for sending a grant signal to the first or second radio circuit portion. In some embodiments, the arbitration circuit portion is arranged to be connected to the first radio circuit portion or the second radio circuit portion by a 2-wire connection, e.g. facilitating the reception of request signals and the issuing of grant signals. In some embodiments, the arbitration circuit portion is arranged to be connected to the first radio circuit portion or the second radio circuit portion by a 3- or 4-wire connection, e.g. facilitating the reception of request signals, the issuing of grant signals and the reception of supplementary information.

The arbitration circuit portion may be provided as a separate device to the first and second radio circuit portions. In other words, the arbitration circuit portion may be a standalone circuit arranged to facilitate coexistence between two (or more) separate radio circuit portions. However, in a set of embodiments, the arbitration circuit portion is provided or integral with the first radio circuit portion. For instance, the arbitration circuit portion may comprise part of a radio processing unit that also comprises the first radio circuit portion. Accordingly, the invention extends to a radio processing unit comprising:

a first radio circuit portion arranged to transmit and/or receive radio signals in a common frequency band; and the arbitration circuit portion as disclosed herein, arranged to coordinate the first radio circuit portion and a second radio circuit portion arranged to transmit and/or receive radio signals in the common frequency band.

In embodiments where the arbitration circuit portion is provided with the first radio circuit portion, inputs from the first radio circuit portion to the arbitration circuit portion and outputs from the arbitration circuit portion to the first radio circuit portion (e.g. request and grant signals) may comprise internal logic connections.

The arbitration circuit portion may be arranged to operate in the normal mode, using the set of arbitration rules to determine arbitration outcomes, whenever it is not operating in the first or second radio priority modes. For instance, the normal arbitration rules may comprise always granting communication requests from the first radio circuit portion unless they coincide with an ongoing communication by the second radio circuit portion. The set of arbitration rules used in the normal mode may be fixed, e.g. determined by pre-configured arbitration logic or a fixed look-up table. Alternatively, the arbitration circuit portion may be arranged to update the set of arbitration rules (e.g. by adjusting a look-up table) if a communication scenario changes.

According to a second aspect there is provided a method of coordinating first and second radio circuit portions arranged to transmit and/or receive radio signals in a common frequency band, said method comprising:

receiving a communication request signal from the first radio circuit portion and/or the second radio circuit portion;

determining an arbitration outcome based at least partially on said communication request signal; and applying said arbitration outcome to the first and/or second radio circuit portions;

wherein the method comprises operating in:

a normal arbitration mode, in which determining the arbitration outcome comprises determining an input state based at least partially on said communication request signal and determining an arbitration outcome that corresponds to said input state according to a set of arbitration rules; and a first radio priority mode in which the arbitration outcome prioritises all communication requests from the first radio circuit portion over communication requests from the second radio circuit portion.

The invention extends to computer software that, when executed by an arbitration circuit portion, causes said arbitration circuit portion to perform the method disclosed herein. The arbitration circuit portion may comprise a memory storing said software. The arbitration circuit portion may comprise a processor arranged to execute said software.

According to a third aspect there is provided a radio system comprising:

a host device;

a first radio circuit portion controlled by the host device and arranged to transmit and/or receive radio signals in a common frequency band;

a second radio circuit portion controlled by the host device and arranged to transmit and/or receive radio signals in the common frequency band; and the arbitration circuit portion as disclosed herein, arranged to coordinate said first and second radio circuit portions.

The radio system may comprise a common antenna arranged to be used for communication by the first and second radio circuit portions. Alternatively, the radio system may comprise separate first and second antennas for the respective first and second radio circuit portions.

The arbitration circuit portion has been described herein in the context of coordinating first and second radio circuit portions arranged to transmit and/or receive radio signals in a common frequency band (i.e. first and second coexisting radio circuit portions). However, the arbitration circuit portion is not limited to coordinating only two radio circuit portions. In a set of embodiments, the arbitration circuit portion also coordinates a third radio circuit portion arranged to transmit and/or receive signals in the common frequency band. For instance, the arbitration circuit portion may be arranged to receive a communication request signal from a third radio circuit portion and/or to apply the arbitration outcome to a third radio circuit portion. It will be recognised that functionality (e.g. priority mode operations) described above with respect to the first and/or second radio circuit portion can also be applied to the third radio circuit portion.

Features of any aspect or embodiment described herein may, wherever appropriate, be applied to any other aspect or embodiment described herein.

Where reference is made to different embodiments, it should be understood that these are not necessarily distinct but may overlap. It will be appreciated that all of the preferred features of the arbitration circuit portion according to the first aspect described above may also apply to the other aspects of the invention.

BRIEF DESCRIPTION OF THE DRAWINGS

One or more non-limiting examples will now be described, by way of example only, and with reference to the accompanying figures in which.

DETAILED DESCRIPTION

Figure 1:
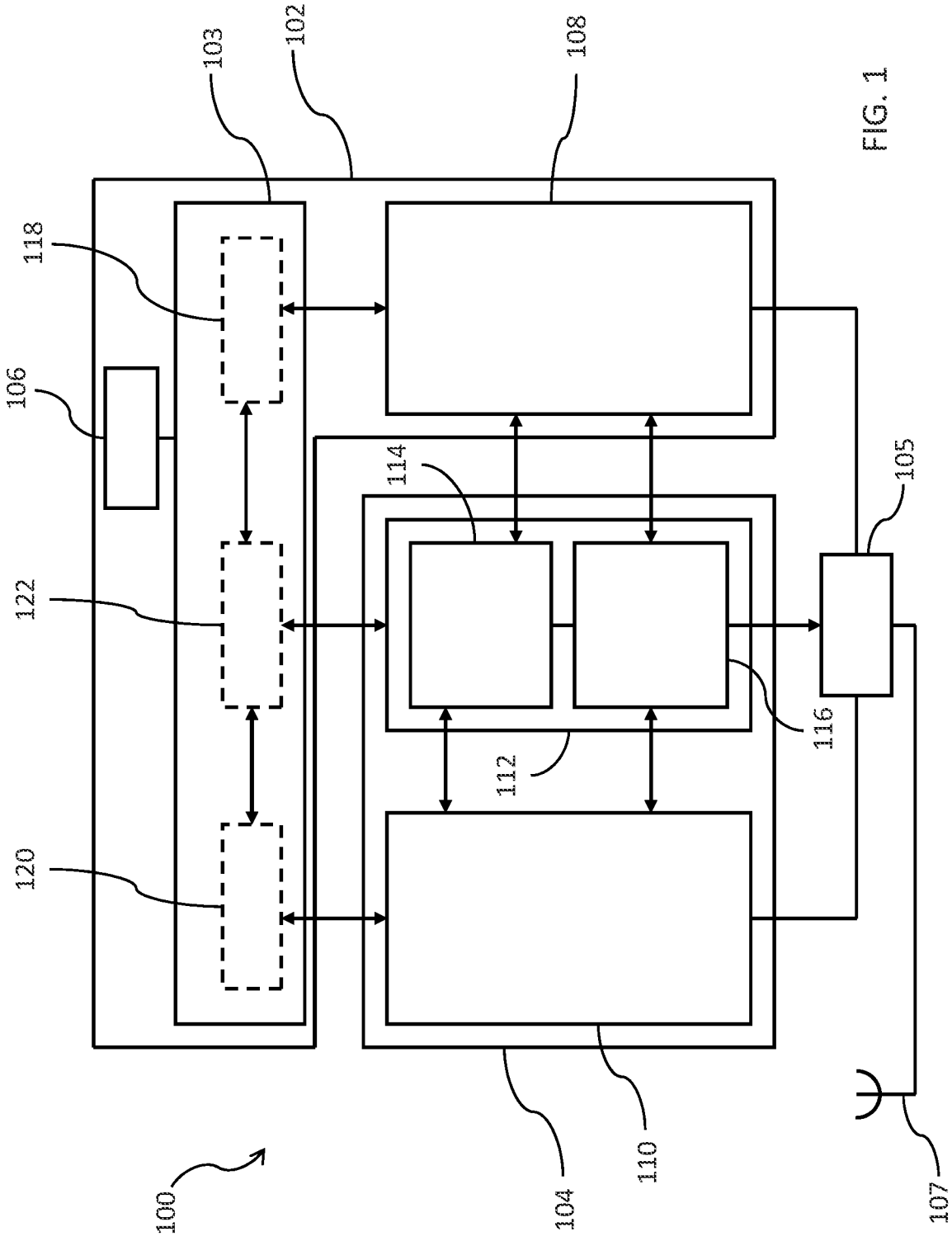
FIG. 1 is a schematic view of a radio communication system according to an embodiment of the invention.

A radio communication system 100 is shown in FIG. 1. The system 100 comprises a host device 102, a WLAN radio device 104, an RF switch 105 and a shared antenna 107. The host device 102 comprises a host processor 103, a memory 106 and a Bluetooth Low Energy (BLE) radio module 108. The WLAN radio device 104 comprises a WLAN radio module 110 and an arbitration circuit portion 112, comprising a controller 114 and coexistence hardware 116. The radio communication system 100 may comprise other radio transmission and reception circuitry not shown.

The memory 106 stores software that is run by the host processor 103 to provide a Bluetooth driver 118 that uses the BLE radio module 108 to send and receive BLE radio packets, and a WLAN driver 120 that uses the WLAN radio module 110 to send and receive WLAN radio packets. The processor 103 also provides a coexistence driver 122 which communicates with the arbitration circuit portion 112.

The BLE radio module 108 sends and receives radio packets using the 2.4 GHz frequency band (i.e. a frequency range near 2.4 GHz). The WLAN radio module 110 can send and receive radio packets using the 2.4 GHz frequency band and a 5 GHz frequency band. The BLE radio module 108 and the WLAN radio module 110 share the same antenna 107. Access to the antenna 107 by the BLE radio module 108 and the WLAN radio module 110 is controlled by the RF switch 105, which is, in turn, controlled by the coexistence hardware 116.

Figure 2:
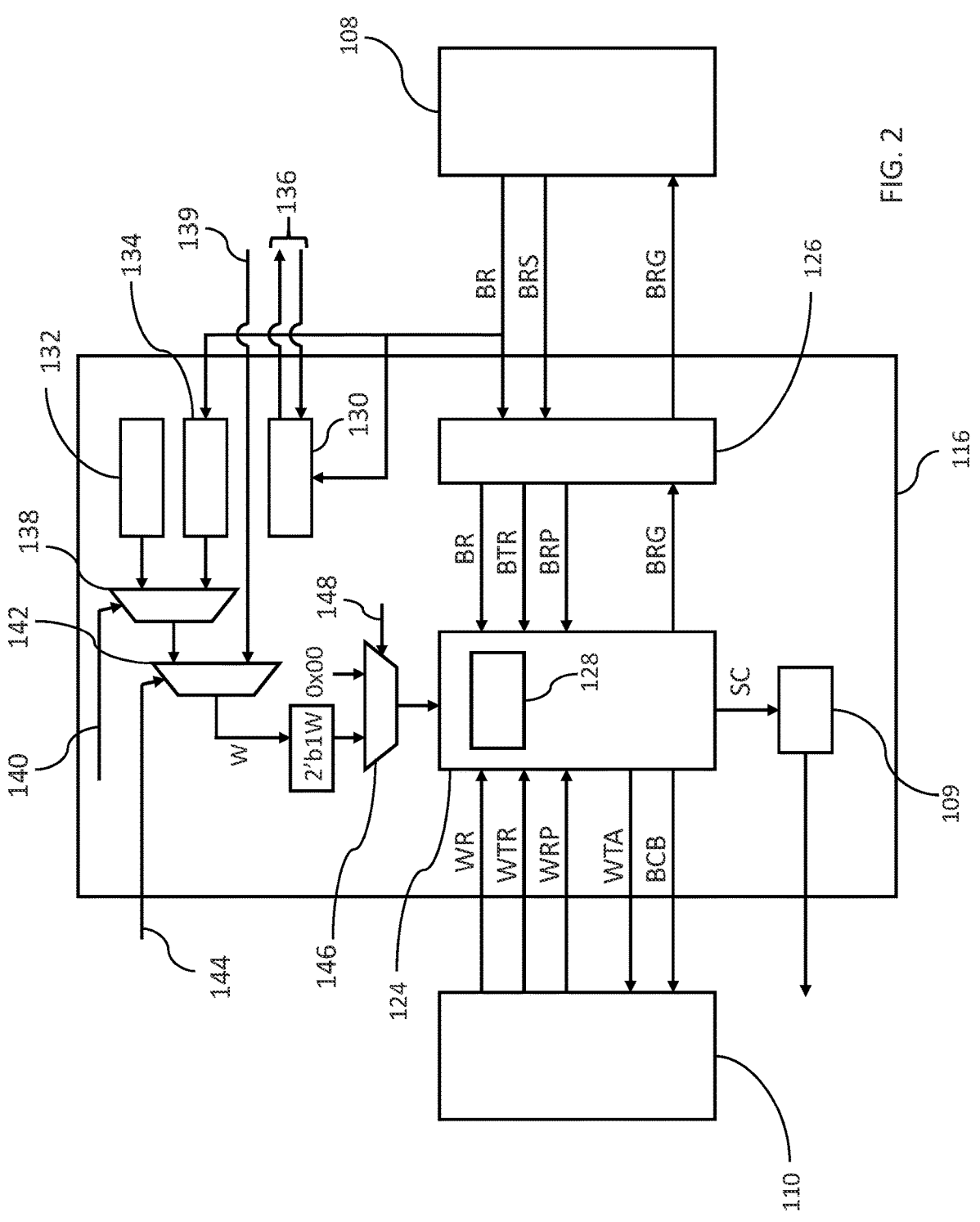
FIG. 2 is a schematic view of coexistence hardware in the radio communication system of FIG. 1.

FIG. 2 shows the coexistence hardware 116 in more detail. The coexistence hardware 116 comprises a packet traffic arbiter (PTA) 124, an interface 126 for communicating with the BLE radio module 108 and an antenna selection map (ASM) 109. The arbitration circuit portion 112 is part of the WLAN radio device 104, so no interface is required for the WLAN radio module 110. The PTA 124 comprises a memory 128 in which an arbitration look-up table is stored. The look-up table stores a series of arbitration outcomes corresponding to a series of input states, the input states including the current activity of the radio modules 108, 110 and the input signals discussed below. The arbitration outcomes indicate a series of output signals for the coexistence hardware 116 to issue.

The PTA 124 has a plurality of inputs for receiving different input signals from the BLE radio module 108 and the WLAN radio module 110. The PTA 124 can receive a WLAN request signal WR, a WLAN communication type signal WTR, a WLAN priority signal WRP, a BLE request signal BR, a BLE communication type signal BTR and a BLE priority signal BRP. The BLE communication type signal BTR and a BLE priority signal BRP are generated by the interface 126 in response to a BLE status signal BRS from the BLE radio module 108, explained in more detail below. In this embodiment, the interface 126 has a 3-wire connection to the BLE radio module 108, and provides a 4-wire connection to the PTA 124.

The PTA 124 also has a plurality of outputs for outputting various signals to the BLE radio module 108, the WLAN radio module 110 and to the RF switch 105 (via the ASM 109). The PTA 124 can issue a WLAN transmission abort signal WTA, a BLE busy signal BCB, a BLE grant signal BRG and an RF switch control signal SC. The ASM 109 maps the RF switch control signal SC to physical control of the RF switch 105.

The coexistence hardware 116 also comprises a BLE traffic measurement circuit portion 130, a periodic priority window generator 132 and a virtual priority window generator 134.

The BLE traffic measurement circuit portion 130 and the virtual priority window generator 134 receive the BLE request signal BR from the BLE radio module 108. The BLE traffic measurement circuit portion 130 also sends and receives measurement control signals 136 to and from the controller 114, as explained below in more detail. The controller 114 acts as a coexistence manager for the coexistence hardware.

The coexistence hardware 116 also comprises a window type multiplexer 138 which selects between outputs from the periodic priority window generator 132 and the virtual priority window generator 134 and is controlled by a window type control signal 140. The coexistence hardware 116 comprises a window allocation multiplexer 142 which selects between an output from the window type multiplexer 138 and a window device signal 139 from the controller 114, and is controlled by a window allocation control signal 144 from the controller 114. Finally, the coexistence hardware 116 comprises a priority window activation multiplexer 146 which selects between a normal mode signal ("0x00") and the output of the window allocation multiplexer 142 appended to a fixed preamble which indicates priority window mode operation ("2'b1"), and is controlled by an activation control signal 148. The operation of these multiplexers is explained in more detail below. The window type control signal 140 and the activation control signal 148 are generated internally by the coexistence hardware 116.

In use, the BLE and WLAN radio modules 108, 110 are used to send and receive radio packets under the control of the host device 102. However, because the BLE and WLAN radio modules 108, 110 can both operate in the 2.4 GHz frequency band, the radio communication system 100 uses the arbitration circuit portion 112 to coordinate the communications of the BLE and WLAN radio modules 108, 110 to mitigate interference. The BLE and WLAN radio modules 108, 110 send communication request signals (e.g. transmit/ receive requests) BR, WR to the coexistence hardware 116 when they need to make a communication, along with the other signals BRS, WTR, WRP to indicate supplementary information regarding each request.

In normal operation, no priority window is activated and the activation control signal 148 is not asserted. The priority window activation multiplexer 146 outputs the normal mode signal ("0x00"), and the coexistence hardware 116 operates in a normal mode in which the PTA 124 uses the look-up table stored in the memory 128 to determine an arbitration outcome (e.g. to grant or refuse a request). This outcome is applied to the BLE and WLAN radio modules 108, 110 and the ASM 109 using the output signals BRG, WTA, BCB, SC.

However, the normal arbitration rules may not be optimal for all conditions and may lead to situations in which one of the BLE and WLAN radio modules 108, 110 dominates over the other.

Therefore, the radio communication system 100 supports the allocation of priority windows to the BLE and WLAN radio modules 108, 110. In a BLE priority window, all BLE communication requests are granted, and any conflicting WLAN requests are refused/aborted. Conversely, in a WLAN priority window, all WLAN communication requests are granted and any conflicting BLE communication requests are refused. The appropriate use of priority windows can allow for more equitable arbitration between the coexisting radio modules.

The radio communication system 100 is operable to provide priority windows to the BLE and WLAN radio modules 108, 110 in three different ways: single priority windows, periodic priority windows and virtual priority windows.

Single Priority Window Operation

For single priority window operation, the BLE and WLAN radio modules 108, 110 can post priority window requests to the controller 114. Each request specifies the start time and duration of the requested window. For instance, the WLAN radio module 110 may request a priority window to protect a period containing high priority communications such as those involved in a connection process, DTIM reception or data capture during calibrations.

If a conflicting priority window has not already been allocated to the BLE radio module 108, the controller 114 simply allocates the requested priority window and the PTA 124 begins to operate in the relevant priority mode (i.e. WLAN or BLE) at the requested time.

If there is a conflicting BLE priority window that has already been allocated, the controller 114 determines whether to allocate the WLAN priority window based on a number of considerations including whether the BLE priority window can be deferred, whether the WLAN priority window can be deferred and the relative importance levels of the BLE and WLAN priority window requests.

If the WLAN priority window request is granted by the controller 114, the controller 114 sets the window device signal 139 to '0' (to indicate a WLAN window), and, when the requested window starts, asserts the window allocation control signal 144.

This causes the window allocation multiplexer 142 to output the window device signal "0". At the same time, the activation control signal 148 is asserted, so that the priority window activation multiplexer 146 outputs window device signal ("0") appended to the fixed preamble. This instructs the PTA 124 to operate in a WLAN priority mode, in which all WLAN requests are granted and any conflicting BLE requests are refused. The WLAN radio module 110 can then perform its high priority communications without being interrupted by BLE activity.

When the window finishes, the controller 114 lowers the window allocation control signal 144 and the activation control signal 148 is lowered. The PTA 124 reverts to a normal arbitration mode once again.

Periodic Priority Window Operation

Figures 3, 4:
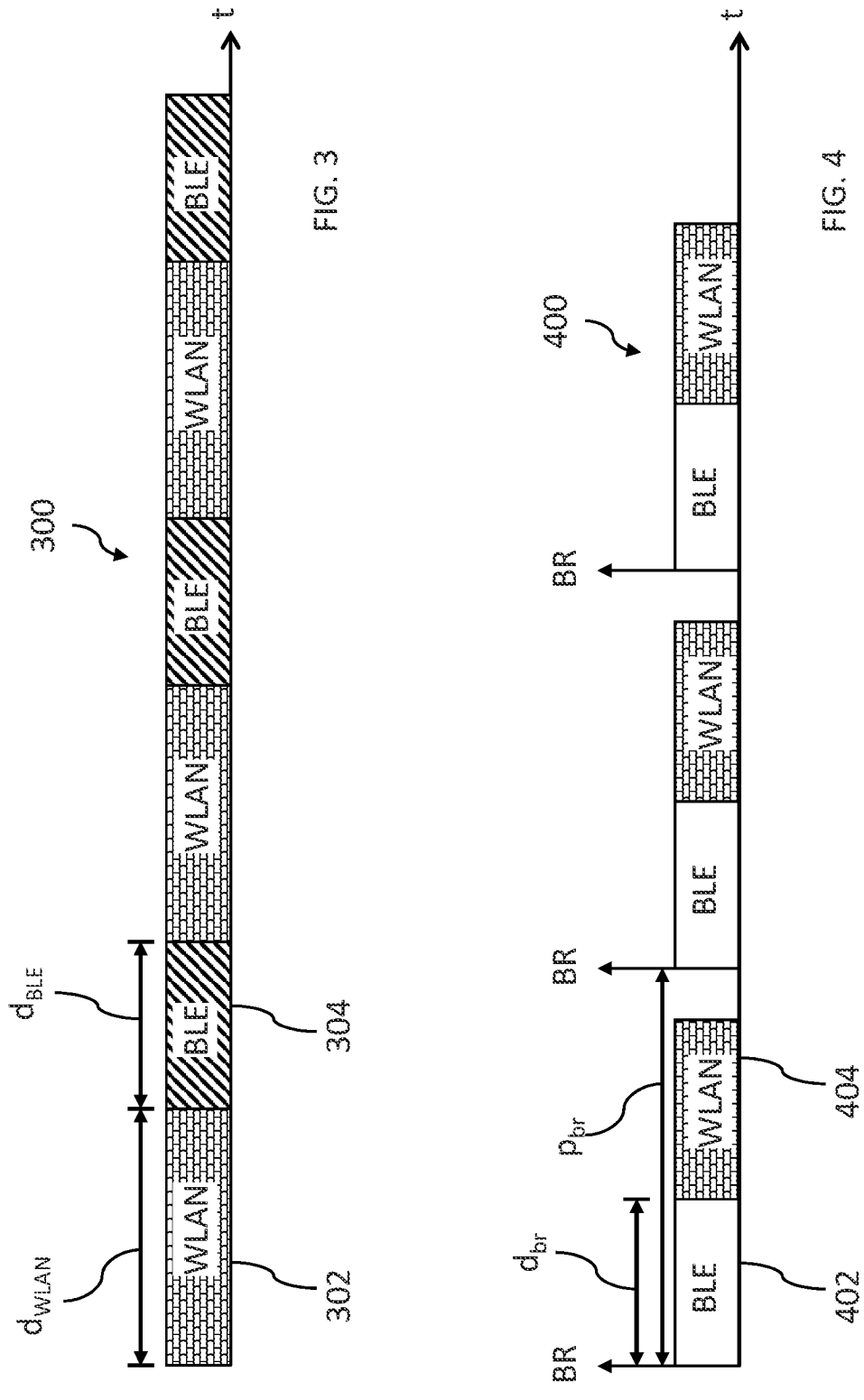
FIG. 3 is a timing diagram illustrating periodic priority window operation of the radio communication system.
FIG. 4 is a timing diagram illustrating virtual priority window operation of the radio communication system.

Periodic priority windows may be used when one or both of the BLE and WLAN radio modules 108, 110 enters a period of high duty-cycle traffic or continuous asynchronous reception (e.g. a scan mode). Periodic priority windows are allocated alternately to the BLE and WLAN radio modules 108, 110 to avoid either device not getting enough opportunity to do its transactions successfully. FIG. 3 is a timing diagram 300 illustrating periodic priority window operation, showing alternating WLAN priority windows 302 (in which the PTA 124 operates in a WLAN priority mode) and BLE priority windows 304 (in which the PTA 124 operates in a BLE priority mode). Each of the WLAN priority windows 302 has a duration $d_{WLAN}$, and each of the BLE priority windows 304 has a duration $d_{BLE}$.

The coexistence driver 122 decides when to allocate periodic priority windows and their durations based on state and/or activity information regarding the BLE and WLAN radio modules 108, 110 received from the BLE and WLAN drivers 118, 120. As explained above, during a phase of periodic priority window operation, the coexistence hardware 116 alternates between BLE and WLAN priority modes.

The coexistence driver 122 communicates to the controller 114 the desired duration of each periodic priority window and which device should have the first window. The controller 114 configures the periodic priority window generator 132, indicating the relative durations of the BLE and WLAN priority windows along with which window should happen first.

In this example, the first periodic priority window is a WLAN priority window 302. The coexistence driver 122 instructs the controller 114 to start periodic priority window operation, which in turn configures coexistence hardware 116 accordingly. The coexistence hardware 116 sets the window type control signal 140 to "0" (to indicate periodic priority windows allocation is on) and asserts activation control signal 148. Because there is no external single window request, the controller 114 sets the window allocation control signal 144 to "0". Because the first priority window is a WLAN priority window 302, the periodic priority window generator 132 outputs a "0" to indicate a WLAN window.

The priority window activation multiplexer 146 outputs the "0" from the periodic priority window generator 132 appended to the fixed preamble. This causes the PTA 124 to operate in the WLAN priority mode, in which all WLAN requests are granted and any conflicting BLE requests are refused. The WLAN radio module 110 can then perform its high priority communications without being interrupted by BLE activity.

When the first WLAN priority window 302 ends, the periodic priority window generator 132 changes its output to a "1", to indicate a BLE window. This "1" is output from the periodic priority window generator 132 appended to the fixed preamble to instruct the PTA 124 to operate in the BLE priority mode, in which all BLE requests are granted and any conflicting WLAN requests are refused or aborted if they have already begun. This process repeats until periodic priority window operation ends and the activation control signal 148 is lowered.

Virtual Priority Window Operation

In this embodiment, virtual priority window generation is used to facilitate WLAN communications in idle periods between periodic BLE communications, for example BLE audio streaming.

The BLE traffic measurement circuit portion 130 monitors the duration and periodicity of BLE request signals BR made by the BLE radio module 108. The coexistence driver 122 decides the number of sets of duration and periodicity to be collected and posts this information to controller 114, which in turn configures the BLE traffic measurement circuit portion 130 and starts the measurement. Once the measurement is complete, the BLE traffic measurement circuit portion 130 indicates this to the controller 114, which reads and reports the duration and periodicity information back to the coexistence driver 122. The coexistence driver 122 calculates a suitable duration for each virtual priority window and passes this to the controller 114, which configures the virtual priority window generator 134 accordingly.

To begin virtual priority window operation, the coexistence driver 122 instructs the controller 114 to start virtual priority window operation, which in turn configures the coexistence hardware 116. The coexistence hardware 116 sets the window type control signal 140 to "1" (to indicate virtual priority window operation is on), so that the output from the virtual priority window generator 134 is selected by the multiplexer 138. The coexistence hardware 116 asserts the activation control signal 148. Because there is no external single window request, the controller 114 sets the window allocation control signal 144 to "0".

FIG. 4 is a timing diagram 400 illustrating virtual priority window operation. The BLE request signal BR is asserted for a duration $d_{br}$ with a period $p_{br}$. The virtual priority window generator 134 monitors the BLE request signal BR and allocates a BLE priority window from the time the BLE request signal BR is asserted to the time it is de-asserted. The virtual priority window generator 134 also allocates a WLAN priority window starting from the time the BLE request signal BR is de-asserted for the duration calculated by the coexistence driver 122. Any remaining time until the next assertion of the BLE request signal BR is left for use by the BLE radio module 108.

The coexistence driver 122 takes a decision on when to stop allocating virtual priority windows to WLAN radio module 110 (e.g. based on state information it receives from the BLE radio module 108) and instructs the controller 114 to stop virtual priority windows operation, which in turn configures the coexistence hardware 116 such that the activation control signal 148 is lowered and the PTA 124 returns to normal operation.

Thus, the radio communication system 100 is provided with several mechanisms for achieving optimal and equitable arbitration between the coexistent BLE and WLAN radio modules 108, 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An arbitration circuit portion for coordinating first and second radio circuit portions arranged to transmit and/or receive radio signals in a common frequency band, wherein said arbitration circuit portion is arranged to:

receive a communication request signal from the first radio circuit portion and/or the second radio circuit portion;

determine an arbitration outcome based at least partially on said communication request signal; and apply said arbitration outcome to the first and/or second radio circuit portions;

wherein the arbitration circuit portion is configured to operate in:

a first arbitration mode, in which determining the arbitration outcome comprises determining an input state based at least partially on said communication request signal and determining an arbitration outcome that corresponds to said input state according to a set of arbitration rules; and a second arbitration mode, in which determining the arbitration outcome comprises prioritising all communication requests from the first radio circuit portion over communication requests from the second radio circuit portion.

2. The arbitration circuit portion of claim 1, arranged to operate in the second arbitration mode based at least partially on one or more external stimuli.

3. The arbitration circuit portion of claim 2, arranged to operate in the second arbitration mode in response to a priority window request from the first radio circuit portion.

4. The arbitration circuit portion of claim 3, arranged to determine whether to grant or refuse a priority window request based on a current state of the arbitration circuit portion and/or a current state of one or both of the first and second radio circuit portions and/or further information relating to the priority window request.

5. The arbitration circuit portion of claim 3 arranged, on receipt of a priority window request, to determine if there exists a conflicting priority window request and, if there is no conflicting priority window request, to grant the received priority window request.

6. The arbitration circuit portion of claim 3, arranged, on receipt of a new priority window request, to determine if there exists a conflicting priority window request and, if there is a conflicting priority window request:

to determine which of the new priority window request and the conflicting priority window request has a higher importance; and to grant the priority window request with the higher importance.

7. The arbitration circuit portion of claim 6, arranged to combine an indication of importance included in a priority window request with a relative precedence of the radio circuit portion from which the request was received.

8. The arbitration circuit portion of claim 1, wherein the arbitration circuit portion is configured to operate in a third arbitration mode in which all communication requests from the second radio circuit portion are prioritised over communication requests from the first radio circuit portion.

9. The arbitration circuit portion of claim 8, arranged to operate in the third arbitration mode in response to a priority window request from the second radio circuit portion.

10. The arbitration circuit portion of claim 1, arranged to operate in the second arbitration mode in first periodic priority windows occurring at regular intervals.

11. The arbitration circuit portion of claim 10, wherein a duration and/or period of a first periodic priority window is determined based on activity of the first and/or second radio circuit portion.

12. The arbitration circuit portion of claim 10, wherein:

the arbitration circuit portion is configured to operate in a third arbitration mode in which all communication requests from the second radio circuit portion are prioritised over communication requests from the first radio circuit portion;

the arbitration circuit portion is arranged to operate in the third arbitration mode in second periodic priority windows occurring at regular intervals; and the arbitration circuit portion is arranged to operate in alternating first and second periodic priority windows.

13. The arbitration circuit portion of claim 1, arranged to operate in the second arbitration mode based on a communication request signal from the second radio circuit portion.

14. The arbitration circuit portion of claim 13, arranged to operate in the second arbitration mode in response to a lowering of a communication request signal from the second radio circuit portion.

15. The arbitration circuit portion of claim 14, arranged, after entering the second arbitration mode in response to the lowering of the communication request signal from the second radio circuit portion, to operate in the second arbitration mode for a duration based on an expected time of a next communication request signal from the second radio circuit portion.

16. The arbitration circuit portion of claim 14, arranged to measure a duration and/or frequency of a series of communication requests from the second radio circuit portion and use said measurement to determine a duration of the period of second arbitration mode operation entered in response to the lowering of a communication request from the second radio circuit portion.

17. The arbitration circuit portion of claim 1, wherein the first radio circuit portion is arranged to transmit and/or receive radio signals according to a wireless local area network protocol, and the second radio circuit portion is arranged to transmit and/or receive radio signals according to a wireless personal area network protocol.

18. A radio system comprising:

a host device;

a first radio circuit portion controlled by the host device and arranged to transmit and/or receive radio signals in a common frequency band;

a second radio circuit portion controlled by the host device and arranged to transmit and/or receive radio signals in the common frequency band; and the arbitration circuit portion of claim 1, arranged to coordinate said first and second radio circuit portions.

19. The radio system of claim 18, comprising a common antenna arranged to be used for communication by the first and second radio circuit portions.

20. A method of coordinating first and second radio circuit portions arranged to transmit and/or receive radio signals in a common frequency band, said method comprising:

receiving a communication request signal from the first radio circuit portion and/or the second radio circuit portion;

determining an arbitration outcome based at least partially on said communication request signal; and applying said arbitration outcome to the first and/or second radio circuit portions;

wherein the method comprises:

operating in a first arbitration mode, in which determining the arbitration outcome comprises determining an input state based at least partially on said communication request signal and determining an arbitration outcome that corresponds to said input state according to a set of arbitration rules; and, at a different time, operating in a second arbitration mode in which the arbitration outcome prioritises all communication requests from the first radio circuit portion over communication requests from the second radio circuit portion.

\* \* \* \* \*